United States Patent
Carr

(10) Patent No.: US 7,355,723 B2
(45) Date of Patent: Apr. 8, 2008

(54) APPARATUS COMPRISING A HIGH-SIGNAL-TO-NOISE DISPLACEMENT SENSOR AND METHOD THEREFORE

(75) Inventor: Dustin Wade Carr, Albuquerque, NM (US)

(73) Assignee: Symphony Acoustics, Inc., Albuquerque, NM (US)

( * ) Notice: Subject to any disclaimer, the term of this patent is extended or adjusted under 35 U.S.C. 154(b) by 210 days.

(21) Appl. No.: 11/366,730

(22) Filed: Mar. 2, 2006

(65) Prior Publication Data

US 2007/0206202 A1    Sep. 6, 2007

(51) Int. Cl.
  *G01B 9/02* (2006.01)
  *G01L 1/24* (2006.01)
(52) U.S. Cl. .................... 356/519; 356/35.5
(58) Field of Classification Search .......... 356/35.5, 356/454, 480, 519; 250/227.19, 227.27; 359/578
See application file for complete search history.

(56) References Cited

U.S. PATENT DOCUMENTS

| | | | |
|---|---|---|---|
| 4,983,824 A | 1/1991 | Saaski et al. | |
| 5,128,537 A | 7/1992 | Halg | |
| 5,589,689 A | 12/1996 | Koskinen | |
| 5,831,262 A | 11/1998 | Greywall et al. | |
| 5,832,157 A | 11/1998 | Berthold et al. | |
| 5,909,280 A | 6/1999 | Zavracky | |
| 5,986,759 A | 11/1999 | DeCain et al. | |
| 6,163,380 A | 12/2000 | Hays | |
| 6,321,010 B1 | 11/2001 | Walker et al. | |
| 6,483,619 B1 | 11/2002 | Greywall | |
| 6,567,572 B2 | 5/2003 | Degertekin et al. | |
| 7,042,579 B2 * | 5/2006 | North Morris | 356/519 |
| 7,164,479 B2 * | 1/2007 | Johansen et al. | 356/506 |
| 2003/0038949 A1 | 2/2003 | Degertekin et al. | |
| 2004/0099799 A1 | 5/2004 | Shinzou | |
| 2004/0130728 A1 | 7/2004 | Degertekin et al. | |
| 2005/0018541 A1 | 1/2005 | Johansen et al. | |
| 2005/0105098 A1 | 5/2005 | Johansen et al. | |
| 2005/0231729 A1 | 10/2005 | Lopushansky et al. | |

FOREIGN PATENT DOCUMENTS

GB    1 234 659 A    8/1971

OTHER PUBLICATIONS

Search Report and Written Opinion, Sep. 18, 2007.
Sagberg, et al., Optical Microphone Based on a Modulated Diffractive Lens, IEEE Photonics Technology Letters, vol. 15, No. 10, Oct. 2003, pp. 1431-1433.

* cited by examiner

*Primary Examiner*—Michael A. Lyons
(74) *Attorney, Agent, or Firm*—DeMont & Breyer LLC

(57) ABSTRACT

An optical displacement sensor is disclosed that provides a high signal-to-noise ratio output signal without some of the disadvantages for doing so in the prior art. An embodiment of the present invention directs a light beam toward a Fabry-Perot interferometer and detects both the reflected and transmitted optical beams that result from interaction with the Fabry-Perot interferometer. Signal processing techniques are applied to signals based on both the reflected and transmitted beams, resulting in higher signal strength and/or reduced noise in the resulting output signal.

22 Claims, 7 Drawing Sheets

APPARATUS COMPRISING A HIGH-SIGNAL-TO-NOISE DISPLACEMENT SENSOR AND METHOD THEREFORE

FIELD OF THE INVENTION

The present invention relates to displacement sensors in general, and, more particularly, to microphones.

BACKGROUND OF THE INVENTION

Displacement sensors, such as microphones and pressure sensors, are well-known. Displacement sensors based on capacitive, impedance, and optical measurements have been developed. Optical displacement sensors are particularly attractive as they overcome many of the limitations of capacitive and impedance measurement techniques, such as low sensitivity, the need for high voltage biasing, poor electrical isolation, or response nonlinearities.

Many optical displacement sensors known in the prior art operate by detecting light reflected by an optical element that changes its reflectivity in response to a pressure differential, sound, vibration, etc. A Fabry-Perot interferometer has often been used as such an optical element. A Fabry-Perot interferometer is an optical element whose reflectivity depends on the spacing between two parallel partially-reflective surfaces. In order to form a Fabry-Perot interferometer that is sensitive to sound, etc., one surface of the Fabry-Perot interferometer is a surface of a movable membrane. When the movable membrane moves in response to incident sound, for example, the reflectivity of the Fabry-Perot interferometer is changed. The intensity of the detected light changes as well, therefore, thereby resulting in an electrical signal based on the incident acoustic energy of the sound.

The dynamic range of the reflectivity change of the Fabry-Perot interferometer limits the sensitivity of prior art microphones. In addition, noise in the detected signal, such as detector noise or source noise, reduces the fidelity of prior art optical microphones, since detector and/or source noise can be difficult to distinguish from a reflectivity change of the Fabry-Perot interferometer. The ratio of signal strength to noise (i.e., the signal-to-noise ratio (SNR)) is a key performance metric for displacement sensor performance. When used as a hearing aid microphone, for example, low SNR impairs the ability to provide clear high-fidelity reproduction of the sound desired by the hearing aid user. It also impairs the ability to improve hearing aid performance through signal processing techniques.

There exists, therefore, a need for an optical displacement sensor that overcomes some of the limitations of the prior art; specifically, an optical microphone with a higher SNR output signal.

SUMMARY OF THE INVENTION

The present invention enables the optical detection of pressure differential without some of the costs and disadvantages for doing so in the prior art. For example, embodiments of the present invention are particularly well-suited for use in microphone, high-sensitivity pressure sensor, vibration sensor, and accelerometer applications.

Embodiments of the present invention, like the prior art, use a movable membrane to provide one surface of an optically-resonant cavity. Unlike the prior art, however, some embodiments of the present invention detect both the reflected beam AND the transmitted beam (i.e., the optical beam that transits the optically-resonant cavity) from the Fabry-Perot interferometer. In addition, some embodiments of the present invention also form a composite output signal from the two detected beams.

In the prior art, only the reflected beam from the Fabry-Perot is detected and used to generate the electrical output signal of the displacement sensor. Much of the available optical energy, therefore, is wasted.

The detection and use of both the reflected and transmitted beams from the optically-resonant cavity, as in the present invention, has several ramifications. First, the optical energy of one of the beams is not wasted, as in the prior art. As a result, the signal strength is higher, which leads directly to an improved SNR. In addition, both the reflected and the transmitted signals are available for signal processing. In some embodiments, well-known signal processing methods are applied to a differential signal based on the two received signals. Rejection of common-mode noise components, such as relative intensity noise, enables a reduction in the noise component of the composite output signal, again improving SNR.

An embodiment of the present invention comprises: a source for providing optical energy; a Fabry-Perot interferometer for receiving the optical energy and distributing the optical energy into a reflected beam and a transmitted beam; a first detector for detecting at least a portion of the reflected beam; and a second detector for detecting at least a portion of the transmitted beam.

DETAILED DESCRIPTION

Figure 1:
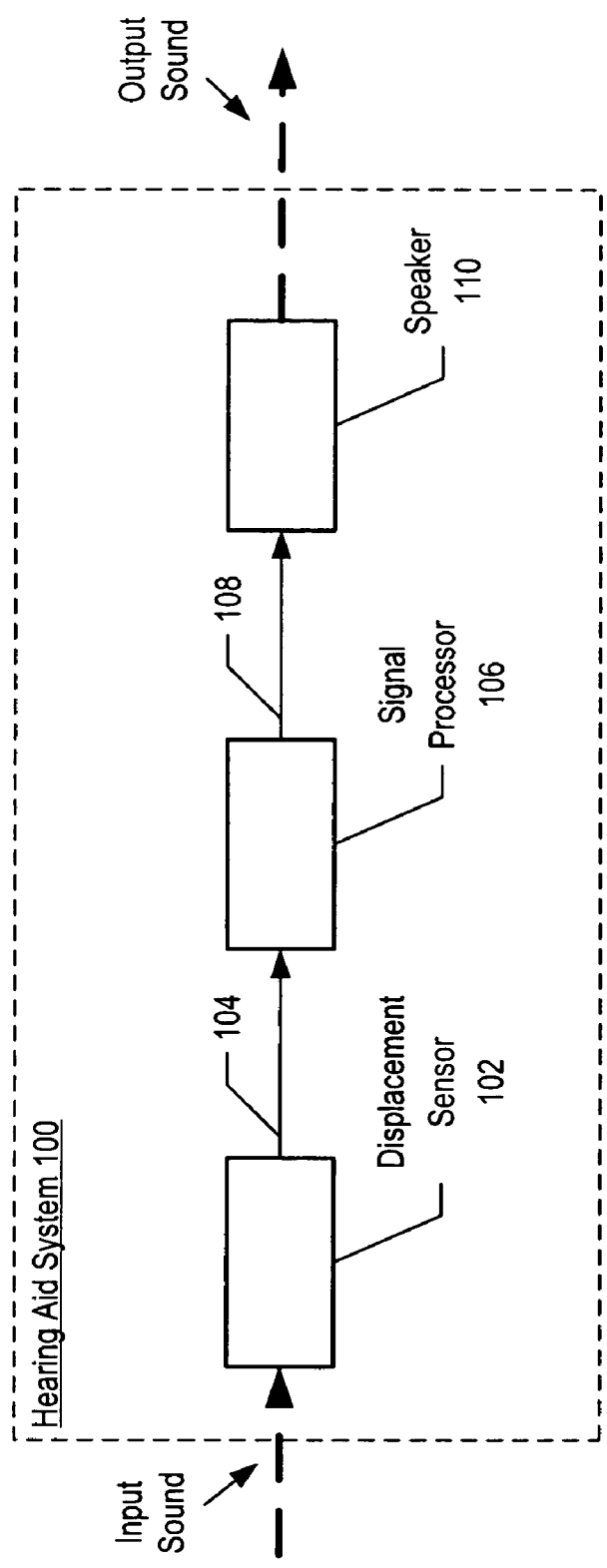
FIG. 1 depicts a schematic diagram of the salient components of a hearing aid according to the illustrative embodiment of the present invention.

The following terms are defined for use in this Specification, including the appended claims:

Optical device means a device that is capable of predictably or controllably affecting an optical signal, such as by absorption, reflection, diffraction, transmission, generating an optical signal, or processing an optical signal. Examples include passive optical devices, such as lenses, mirrors, switches, diffraction gratings, etc., and active optical devices, such as lasers, light-emitting diodes, etc.

Fabry-Perot etalon means an optically-resonant cavity formed by two substantially parallel and substantially flat surfaces that are separated by a cavity length, wherein the cavity length is fixed.

Fabry-Perot interferometer means an optically-resonant cavity formed by two substantially parallel and substantially flat surfaces that are separated by a cavity length, wherein the cavity length is not fixed. Examples include arrangements of plates wherein the cavity length is controllably-varied using an actuator, as well as arrangements wherein the cavity length can vary in response to a stimulus, such as incident acoustic energy.

Cavity length means the instantaneous separation between two surfaces that form an optically-resonant cavity. Cavity length is fixed in the case of an optically-resonant etalon. Cavity length is variable in the case of an interferometer, such as a Fabry-Perot interferometer.

Reflected means reflected externally to an element. A beam reflected by an element, for example, undergoes a change in propagation direction, due to interaction with the element, of at least 90 degrees. It does NOT mean energy that reflects internally within the element. For example, reflected energy from an optically-resonant cavity means light reflected away from a surface of the cavity, not light reflecting between the two surfaces that form the cavity.

Transmitted means not reflected externally to or absorbed by an element. A transmitted beam undergoes a change in propagation direction of less than 90 degrees after interaction with the element. Examples of transmitted beams include, without limitation: a light beam that passes completely through a lens, dielectric layer, or material; a light beam that is refracted by a prism; and, light that passes through at least one surface that forms an optically-resonant cavity.

Reflective-surface means a surface that reflects a significant amount of optical energy at the wavelength or wavelengths suitable for an application.

Mechanically-coupled means that one device is linked to another device such that movement of the one device affects the other device. For example, a motor and a mirror are mechanically-coupled if actuation of the motor causes motion of the mirror. This could be through direct contact, as in the case of two physically-coupled devices (e.g., a mirror that is mounted on a linear-motor); or through an intermediate medium (e.g., a mirror that is moved via a hydraulic force that is generated by a motor).

Monolithically-integrated means formed either: in the body of a layer or substrate, typically by etching into the layer or substrate or; on the surface of the layer or substrate, typically by patterning layers disposed on the surface.

Operatively-coupled means that the operation of one device affects another device.

Physically-coupled means in direct, physical contact (e.g., a mirror that is mounted on a linear-motor).

FIG. 1 depicts a schematic diagram of the salient components of a hearing aid according to the illustrative embodiment of the present invention. Hearing aid system 100 comprises displacement sensor 102, signal processor 106, and speaker 110. Hearing aid system 100 receives input sound (i.e., acoustic energy), conditions the received sound, and provides output sound to the ear of a user.

Displacement sensor 102 is an optical microphone as will be described in more detail below and with respect to FIG. 2. Displacement sensor 102 provides electrical signal 104 to signal processor 106, wherein the characteristics of electrical signal 104 are based on input sound received by displacement sensor 102.

Signal processor 106 is a processing system that receives electrical signal 104 and performs signal processing. Signal processor 106 comprises an analog-to-digital converter, a digital signal processor, and a digital-to-analog converter. Signal processor 106 provides electrical signal 108 to speaker 110, wherein electrical signal 108 is conditioned to provide:

i. enhanced signal strength; or
  ii. improved signal clarity; or
  iii. reduced signal noise; or
  iv. providing a directionally-adapted signal; or
  v. any combination of i, ii, iii, and iv.

In some embodiments of the present invention, signal processor comprises a fully-programmable gate array (FPGA) that facilitates execution of signal conditioning and software instructions.

Speaker 110 is an acoustic transducer for converting an electrical signal into acoustic energy in well-known fashion.

In some embodiments of the present invention, the function of signal processor 106 is incorporated into displacement sensor 102; therefore, signal processor 106 is not included in these embodiments.

Figure 2:
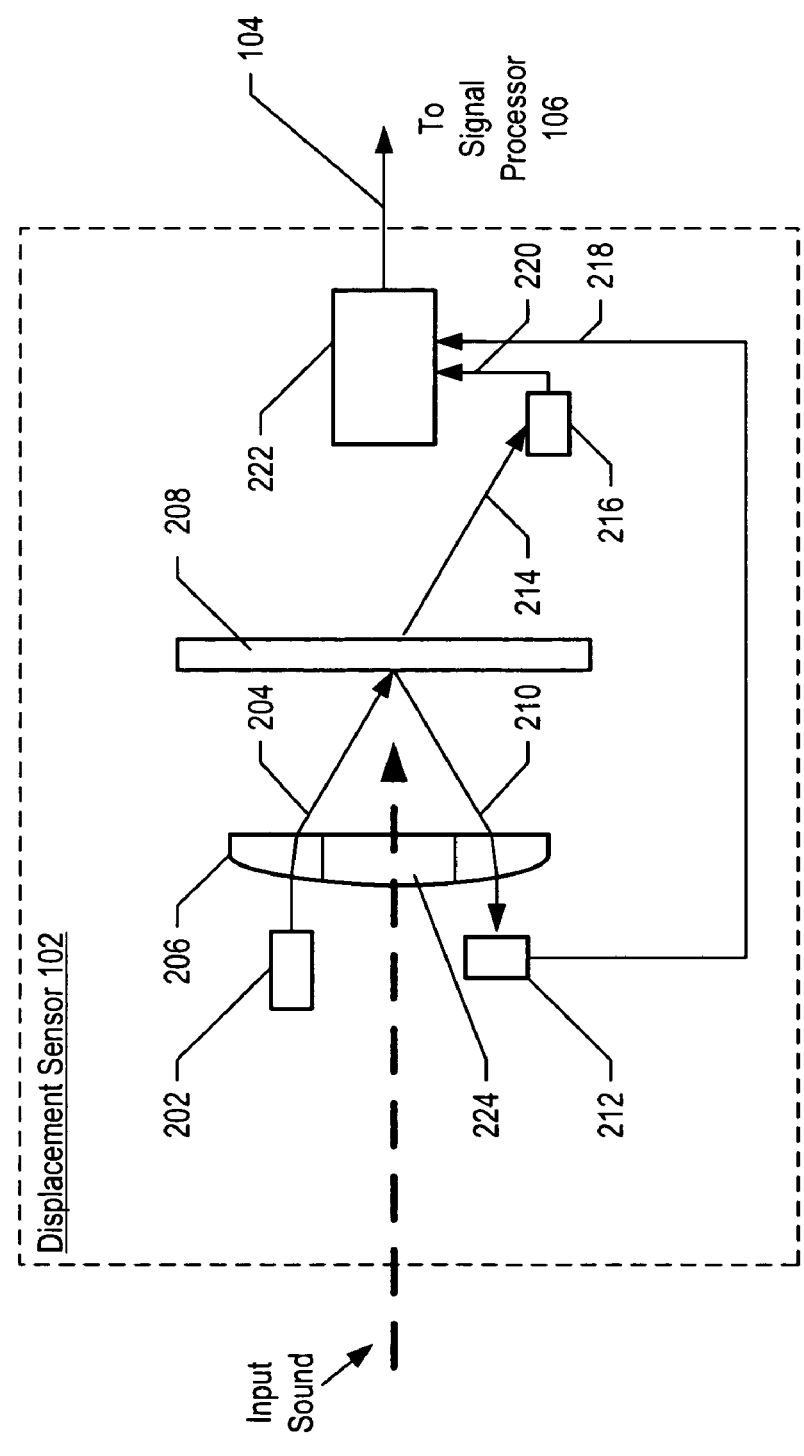
FIG. 2 depicts a schematic diagram of the salient components of a displacement sensor according to the illustrative embodiment of the present invention.

FIG. 2 depicts a schematic diagram of the salient components of a displacement sensor according to the illustrative embodiment of the present invention. Displacement sensor 102 comprises source 202, lens 206, Fabry-Perot interferometer 208, detector 212, detector 216, and processor 222. Displacement sensor converts received acoustic energy into electrical signal 104 and provides electrical signal 104 to signal processor 106.

Source 202 is a laser diode capable of emitting monochromatic light at 850 nanometers (nm) with a spectral-width of less than ten (10) nanometers, and preferably less than three (3) nanometers. In some embodiments of the present invention, source 202 comprises a light-emitting diode. In still some other embodiments, source 202 comprises a super-luminescent light-emitting diode. In still some other embodiments of the present invention, source 202 comprises a narrow-wavelength-band filter that reduces the spectral bandwidth of source 202.

Lens 206 is a plano-convex lens that is suitable for collimating light emitted by a source 202 in well-known fashion. Lens 206 includes access hole 224, which facilitates the propagation of acoustic energy toward Fabry-Perot interferometer 208. In some embodiments, lens 206 does not include access hole 224. Lens 206 is aligned to source 202 such that the output of source 202 is received off the central axis of lens 206. Lens 206 collimates the output of source 202 into optical beam 204 and directs optical beam 204 toward the focal point of lens 206. Lens 206 also receives reflected beam 210 from Fabry-Perot interferometer 208 and focuses the optical energy of reflected beam 210 toward detector 212. The configuration of lens 206, with respect to source 202, Fabry-Perot interferometer 208, and detector 212, is often referred to as a "pupil-division" configuration.

In some embodiments of the present invention, lens 206 is not present. In these embodiments, source 202 comprises a collimating lens and a non-orthogonal angle is formed by the direction of propagation of the output of source 202 and Fabry-Perot interferometer 208.

Fabry-Perot interferometer 208 is a variable-reflectivity optical element that comprises two partially-reflective surfaces that are separated from one another. The two surfaces define an optically-resonant cavity, which is characterized by a cavity length. Fabry-Perot interferometer receives optical beam 204 and splits it into reflected beam 210 and transmitted beam 214. The ratio of optical energy in reflected beam 210 and transmitted beam 214 is a function of the cavity length of Fabry-Perot interferometer 208. As will be described below, and with respect to FIG. 3, one surface of Fabry-Perot interferometer 208 is located on a movable membrane that is suitable for motion in response to incident acoustic energy. The cavity length of Fabry-Perot interferometer 208, therefore, is a function of received acoustic energy. As a result, the ratio of optical energy in reflected beam 210 and transmitted beam 214 is a function received acoustic energy.

Detectors 212 and 216 are photodetectors sensitive to the wavelength of the output light from source 202. Each of detectors 212 and 216 measure the intensity of the light that is incident on it and transmits an electrical signal indicative of that intensity to processor 222. It will be clear to those skilled in the art, after reading this specification, how to make and use detectors 212 and 216. Detector 212 receives reflected beam 210 and detector 216 receives transmitted beam 214.

Processor 222 is a general-purpose processor that is capable of reading data and instructions from a memory, of executing instructions, of writing data to a memory, of receiving data from detectors 212 and 216, and of providing electrical signal 104 to signal processor 106. Processor 222 receives electrical signals 218 and 220 and performs signal processing based on those signals. It will be clear to those skilled in the art, after reading this specification, how to make and use processor 222.

In some embodiments of the present invention, processor 222 comprises analog circuitry, such as a closed-loop feedback circuit, for reducing noise-derived contributions to electrical signal 104.

Figure 3:
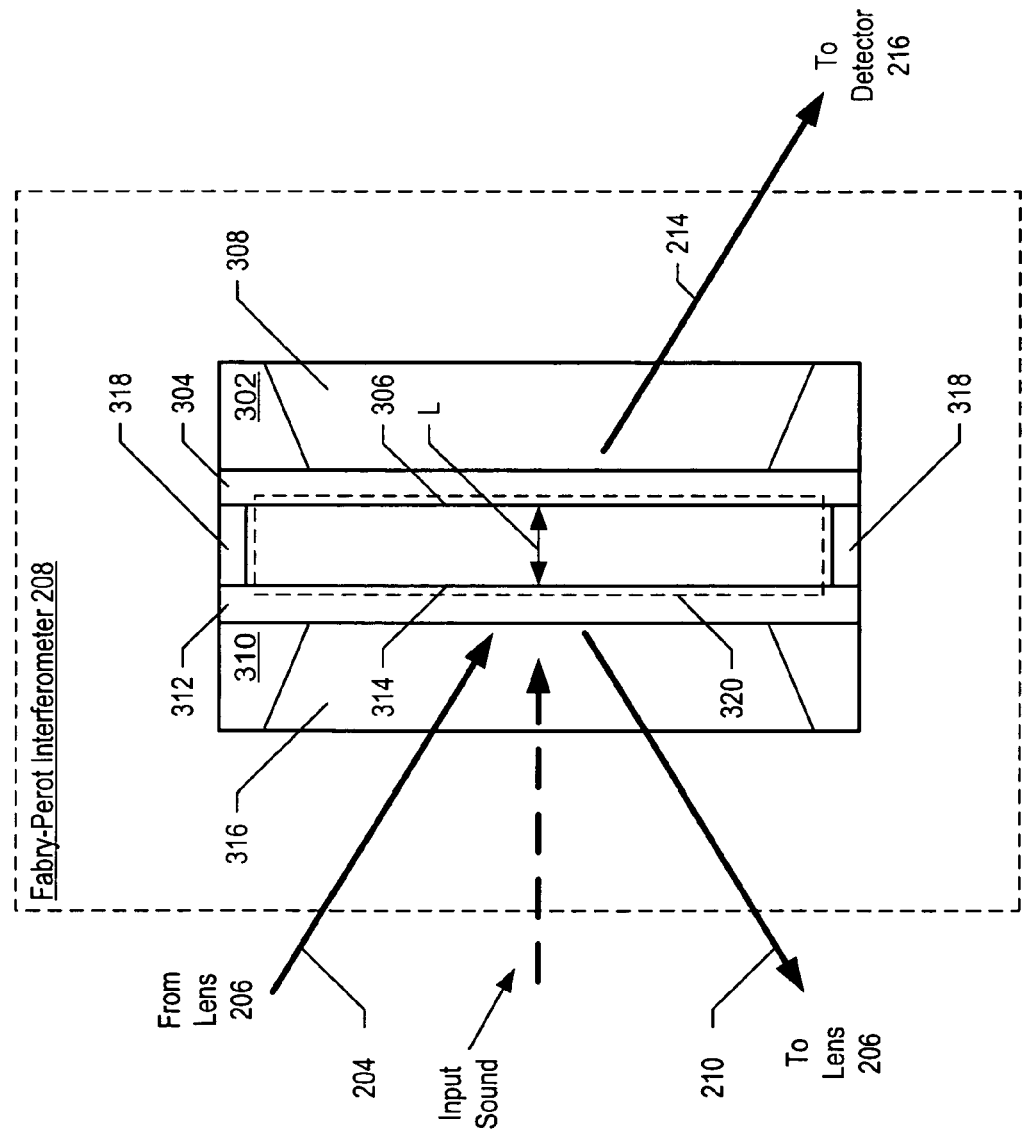
FIG. 3 depicts a cross-sectional view of the salient components of a Fabry-Perot interferometer according to the illustrative embodiment of the present invention.

FIG. 3 depicts a cross-sectional view of the salient components of a Fabry-Perot interferometer according to the illustrative embodiment of the present invention. Fabry-Perot interferometer 208 comprises substrate 302, layer 304, substrate 310, layer 312, and spacers 318. Fabry-Perot interferometer 208 receives optical beam 204 from lens 206 and splits the optical energy of optical beam 204 into reflected beam 210 and transmitted beam 214. The ratio of optical energy in reflected beam 210 and transmitted beam 214 is dependent upon the characteristics of optically-resonant cavity 320, as will be described below. Optically-resonant cavity 320 is formed by a surface 306 of layer 304 and surface 314 of layer 312, which are separated by cavity length L.

Substrate 302 is a 500 micron-thick silicon wafer. Substrate 302 provides a mechanical platform for layer 304. Substrate 302 comprises access hole 308, which removes silicon from the path of light beam 214 in order to reduce absorption of optical energy by substrate 302. By virtue of access hole 308, layer 304 is a movable membrane. In some embodiments of the present invention, substrate 302 is a material other than silicon. Suitable materials for substrate 302 include, without limitation, glass, III-V compound semiconductors, II-VI compound semiconductors, ceramics, and germanium. In some embodiments of the present invention, substrate 302 does not include access hole 308.

Layer 304 is a layer of material that is translucent for a wavelength of light that composes optical beam 204. Layer 304 is approximately $n*\lambda/4$-thick, where $\lambda$ is the wavelength (within layer 304) of light provided by source 202 and n is an odd-integer. Layer 304 comprises surface 306, which composes one surface of optically-resonant cavity 320. In some embodiments of the present invention, layer 304 comprises a 100 nm-thick layer of silicon-rich silicon nitride (SiRN). The thickness of layer 304 is determined so as to provide suitable performance of Fabry-Perot interferometer 208 for the wavelength of light provided by source 202. It will be appreciated by those skilled in the art that the distribution of optical energy into the reflected beam and transmitted beam is dependent upon the thickness and index of refraction of each of layers 304 and 312. In addition, it will be appreciated by those skilled in the art that thicknesses of layer 304 other than $\lambda/4$ can provide suitable performance, such as any odd-order of $\lambda/4$ (e.g., $3\lambda/4$, $5\lambda/4$, etc.). In some embodiments of the present invention, (e.g., wherein a different ratio of transmitted light to reflected light or different mechanical characteristics for layer 304 are desired) the thickness of layer 304 is approximately an even-order of $n*\lambda/4$ (e.g., $\lambda/2$, $\lambda$, $3\lambda/2$, etc.), and n is an even-integer. In still some other embodiments of the present invention, the thickness of layer 304 is made different than any order of $n*\lambda/4$ in order to compensate for a deviation from normal incidence of optical beam 204 at interferometer 208.

In the illustrative embodiment of the present invention, substrate 310 is a 500 micron-thick silicon wafer. It will be clear to those skilled in the art, after reading this specification, how to make and use alternative embodiments of the present invention wherein substrate 310 has a thickness other than 500 microns. It will also be clear to those skilled in the art, after reading this specification, how to make and use alternative embodiments wherein substrate 310 comprises a material other than silicon. Substrate 310 provides a mechanical platform for layer 312. Substrate 310 comprises access hole 316, which removes silicon from the path of light beam 206 in order to reduce absorption of optical energy by substrate 310. By virtue of access hole 316, layer 312 is a movable membrane. In some embodiments of the present invention, substrate 310 is a material other than silicon. Suitable materials for substrate 310 include, without limitation, glass, III-V compound semiconductors, II-VI compound semiconductors, ceramics, and germanium. In some embodiments of the present invention, substrate 310 does not include access hole 316. In some embodiments of the present invention, substrate 310 is not present. In some embodiments of the present invention, layer 312 and spacers 318 are disposed on substrate 302. In some embodiments of the present invention, layer 304 is not present and the optically-resonant cavity is formed by a surface of layer 312 and a surface of substrate 302.

Layer 312 is a layer of material that is translucent at the wavelength of light provided by source 202. The thickness of layer 312 is approximately $\lambda/4$, where $\lambda$ is the wavelength (within layer 312) of light provided by source 202. Layer 312 comprises surface 314, which composes one surface of optically-resonant cavity 320. In the illustrative embodiment of the present invention, layer 312 comprises a 100 nm-thick layer of SiRN. The thickness of layer 312 is determined so as to enable the desired ratio of reflectivity to transmissivity for Fabry-Perot interferometer 208 for the wavelength of light provided by source 202. It will be appreciated by those skilled in the art that other thicknesses of layer 312 can be used, such as any odd-order of $n*\lambda/4$, where n is an odd-integer (e.g., $3\lambda/4$, $5\lambda/4$, etc.). In some embodiments of the present invention, wherein it is desirable to substantially invert the ratio of reflectivity to transmissivity (from that of the illustrative embodiment), the thickness of layer 312 is approximately an order of $n*\lambda/2$, where n is an integer (e.g., $\lambda/2$, $\lambda$, $3\lambda/2$, etc.). In still some other embodiments of the present invention, the thickness of layer 304 is made different than any order of n*λ/4 in order to compensate for a deviation from normal incidence of optical beam 204 at interferometer 208.

Since, in some embodiments of the present invention, both reflected beam 206 and transmitted beam 214 are detected, greater tolerance to layer thickness variation is gained. In some embodiments of the present invention, therefore, the thicknesses of layers 304 and 312 can be substantially different than an even or odd order of λ/4. In some embodiments, the thickness of layer 304 is different than the thickness of layer 312.

In some embodiments of the present invention, at least one of layers 304 and 312 comprises a material other than SiRN. In still some other embodiments of the present invention, at least one of layers 304 and 312 comprises a plurality of layers of different materials. Suitable materials for use in layers 304 and 312 include, without limitation, silicon, silicon dioxide, silicon oxide (SiOx, where x is in the range of 0.1 to 4), titanium nitride, polysilicon, stoichiometric silicon nitride ($Si_3N_4$), III-V compound semiconductors, and II-VI compound semiconductors. In still some other embodiments of the present invention, the thickness of at least one of layers 304 and 312 is other than an even or odd order of λ/4. In still some other embodiments of the present invention, at least one of layers 304 and 312 comprises at least one through-hole to facilitate response of Fabry-Perot interferometer 208 to changes in pressure (e.g., in order to provide or avoid mechanical damping effects, etc.).

Spacers 318 are precision ceramic spacers that have a thickness of approximately 110 microns. The thickness of spacers 318 is determined so as to provide suitable performance of Fabry-Perot interferometer 208 for the wavelength of light provided by source 202. In some embodiments of the present invention, spacers 318 comprise silicon, and are formed by etching away a silicon wafer that interposes layers 304 and 312. In still some other embodiments, spacers 318 comprise a material other than ceramic or silicon. Suitable materials for spacers 318 include, without limitation, metals, epoxies, solder, silicon dioxide, glass, alumina, III-V compound semiconductors, and II-VI compound semiconductors. Although the illustrative embodiment comprises spacers that have a thickness of approximately 110 microns, it will be clear to those skilled in the art, after reading this specification, how to make and use alternative embodiments of the present invention that comprises spacers that have a thickness of other than 110 microns.

Optically-resonant cavity 320 comprises surface 306 and surface 314, which are separated by cavity-length L. In the absence of a pressure differential across the thickness of either layer 304 or 312, cavity-length L is equal to the thickness of space 318. In the presence of a pressure differential (e.g., due to incident acoustic energy) across its thickness, however, the movable membrane portion of layer 304 moves and thereby changes cavity length L. Those skilled in the art will appreciate that the reflection and transmission characteristics of an optically-resonant cavity is dependent upon its cavity length.

Hearing aid system 100, which is described above and with respect to FIG. 1, depicts the use of displacement sensor 102 in dynamic-mode (i.e., operating as a microphone). In order to more clearly demonstrate the present invention, operation of displacement sensor 102 as a high signal-to-noise ratio (SNR) microphone is described here, with reference to FIGS. 2, 3 and 5.

Figure 5:
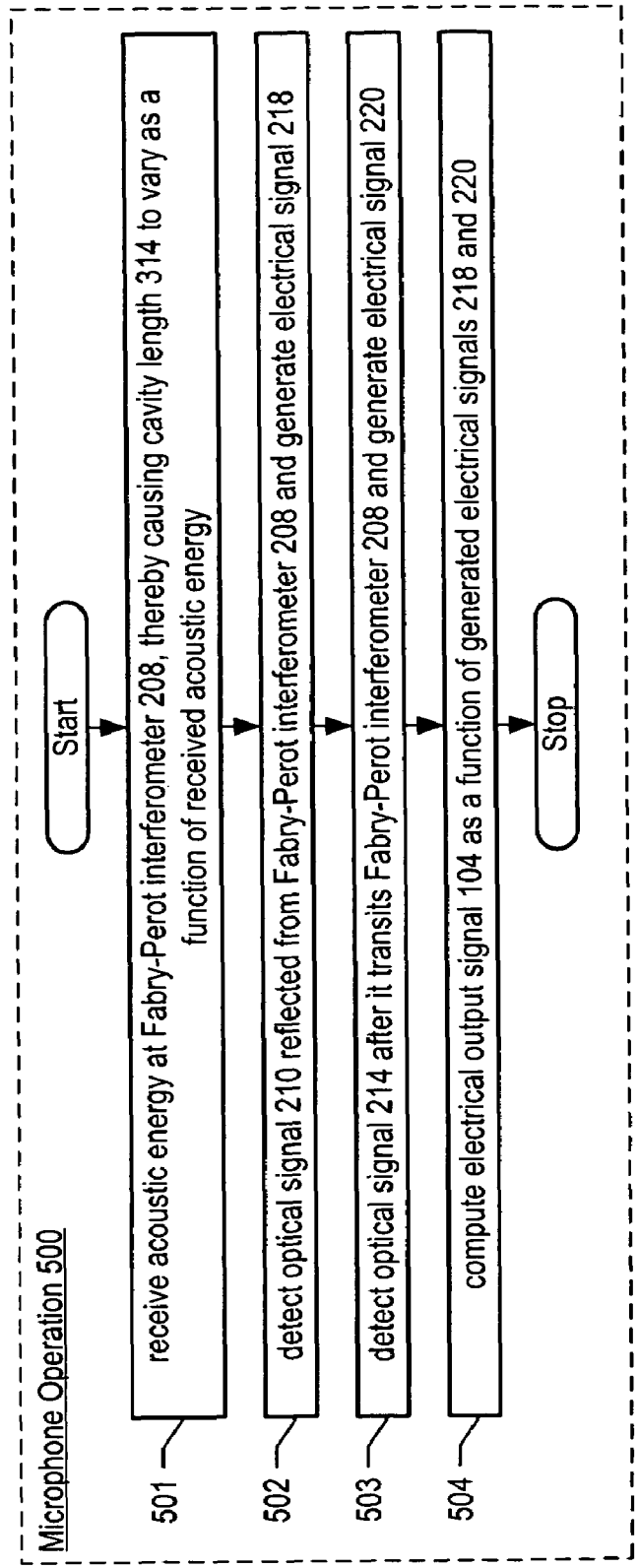
FIG. 5 depicts a method for detecting an acoustic signal with high signal-to-noise ratio.

As depicted in FIG. 5, at operation 501, acoustic energy (i.e., sound) is received by Fabry-Perot interferometer 208. The received acoustic energy causes motion of layer 312, thereby causing a change in cavity length L. As cavity length L changes, the ratio of optical energy in reflected beam 210 and transmitted beam 214 changes.

At operation 502, reflected beam 210 is received by detector 212. Detector 212 generates electrical signal 218, which is based on the intensity of reflected beam 210 and provides electrical signal 218 to processor 222.

At operation 503, transmitted beam 214 is received by detector 216. Detector 216 generates electrical signal 220, which is based on the intensity of transmitted beam 210 and provides electrical signal 220 to processor 222.

At operation 504, processor 222 computes electrical signal 104, which is based on electrical signals 218 and 220. During the computation of electrical signal 104, processor 222 utilizes signal processing techniques to reduce contributions from noise sources such as relative intensity noise, and white noise. It will be clear to those skilled in the art, after reading this specification, how to make and use embodiments of the present invention that utilize signal processing techniques to reduce noise-derived contributions to the electrical output signal. In addition, the signal strength of electrical signal 104 is increased due to the fact that nearly all of the optical power received by Fabry-Perot interferometer 208 is detected and converted to electrical signal by the combination of detectors 212 and 216. Processor 222, therefore, is capable of enhancing the signal strength of electrical signal 104. The combination of enhanced signal strength and reduced noise leads to a significant increase in SNR for electrical signal 104. In some embodiments of the present invention, processor 222 utilizes analog signal conditioning techniques to reduce noise-derived contributions to electrical signal 104. It will be clear to those skilled in the art, after reading this specification, how to make and use embodiments of the present invention that utilize such analog signal conditioning techniques.

Figure 4A:
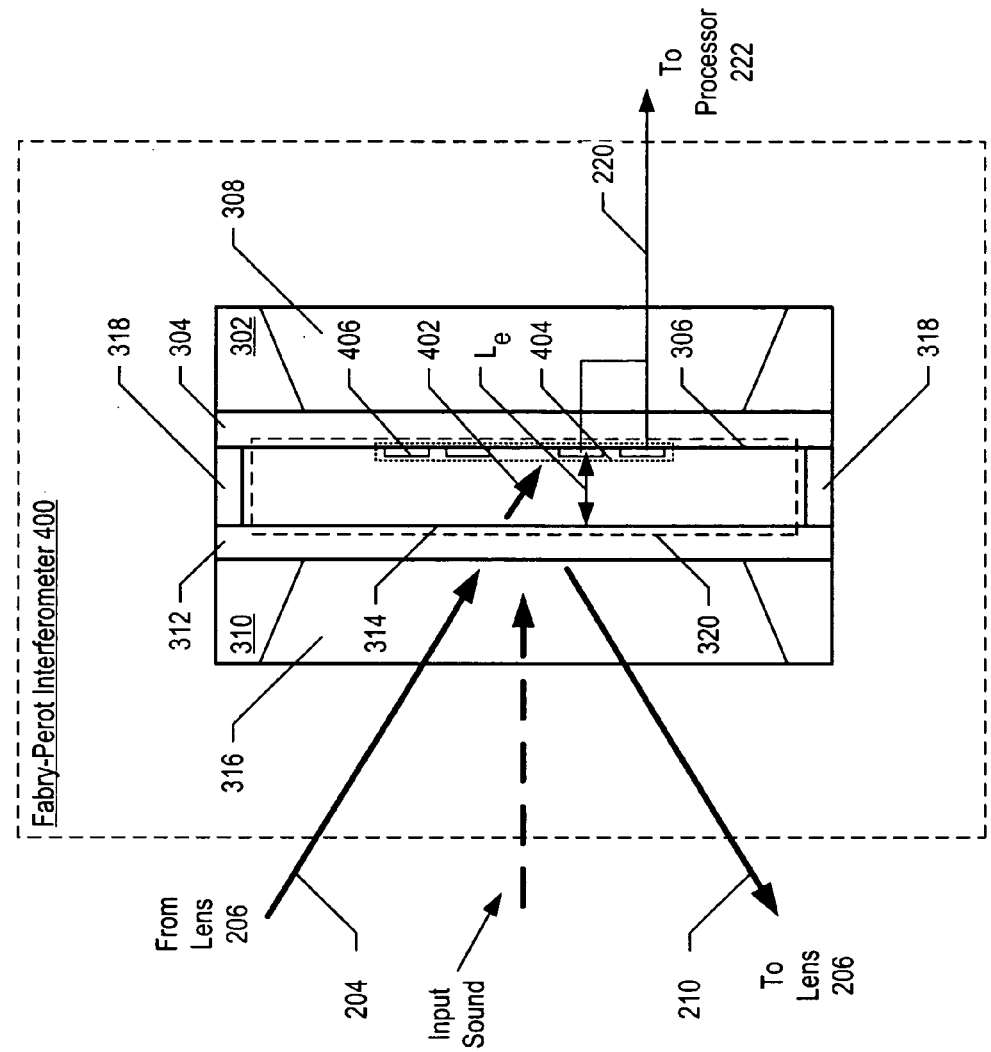
FIG. 4A depicts a cross-sectional view of the salient components of a Fabry-Perot interferometer according to an alternative embodiment of the present invention.

FIG. 4A depicts a cross-sectional view of the salient components of a Fabry-Perot interferometer according to an alternative embodiment of the present invention. Fabry-Perot interferometer 400 comprises substrate 302, layer 304, substrate 310, layer 312, spacers 318, and detector 404. Fabry-Perot interferometer 400 receives optical beam 204 from lens 206 and splits the optical energy of optical beam 204 into reflected beam 210 and transmitted beam 402. Transmitted beam 402 transits only surface 312 of optically-resonant cavity 316. The ratio of optical energy in reflected beam 210 and transmitted beam 402 is dependent upon the characteristics of optically-resonant cavity 320, as was discussed above and with reference to FIG. 3. Optically-resonant cavity 320 is formed by surface 314 of layer 312 and a combination of surface 306 of layer 304 and the surface or surfaces 406 of detector 404. The non-planar combination of surface 306 and surface 406 are separated by effective cavity length $L_e$.

Detector 404 receives transmitted beam 402 and generates electrical signal 220, which is based on the intensity of transmitted beam 402. Detector 404 provides electrical signal 220 to processor 222. Detector 404 is a segmented ring detector that provides a measure of the intensity profile of transmitted beam 402. In some embodiments, detector 404 is a single element detector. In some embodiments, detector 404 is a segmented detector whose structure influences the optical behavior of optically-resonant cavity 320. In some embodiments, detector 404 acts as a diffractive element, such as a diffraction grating or fresnel lens. In some embodiments, detector 406 is a passive optical element, such as a diffraction grating or fresnel lens, and detection of transmitted beam 402 is done outside optically-resonant cavity 320 (as in the embodiment depicted in FIG. 3).

Figure 4B:
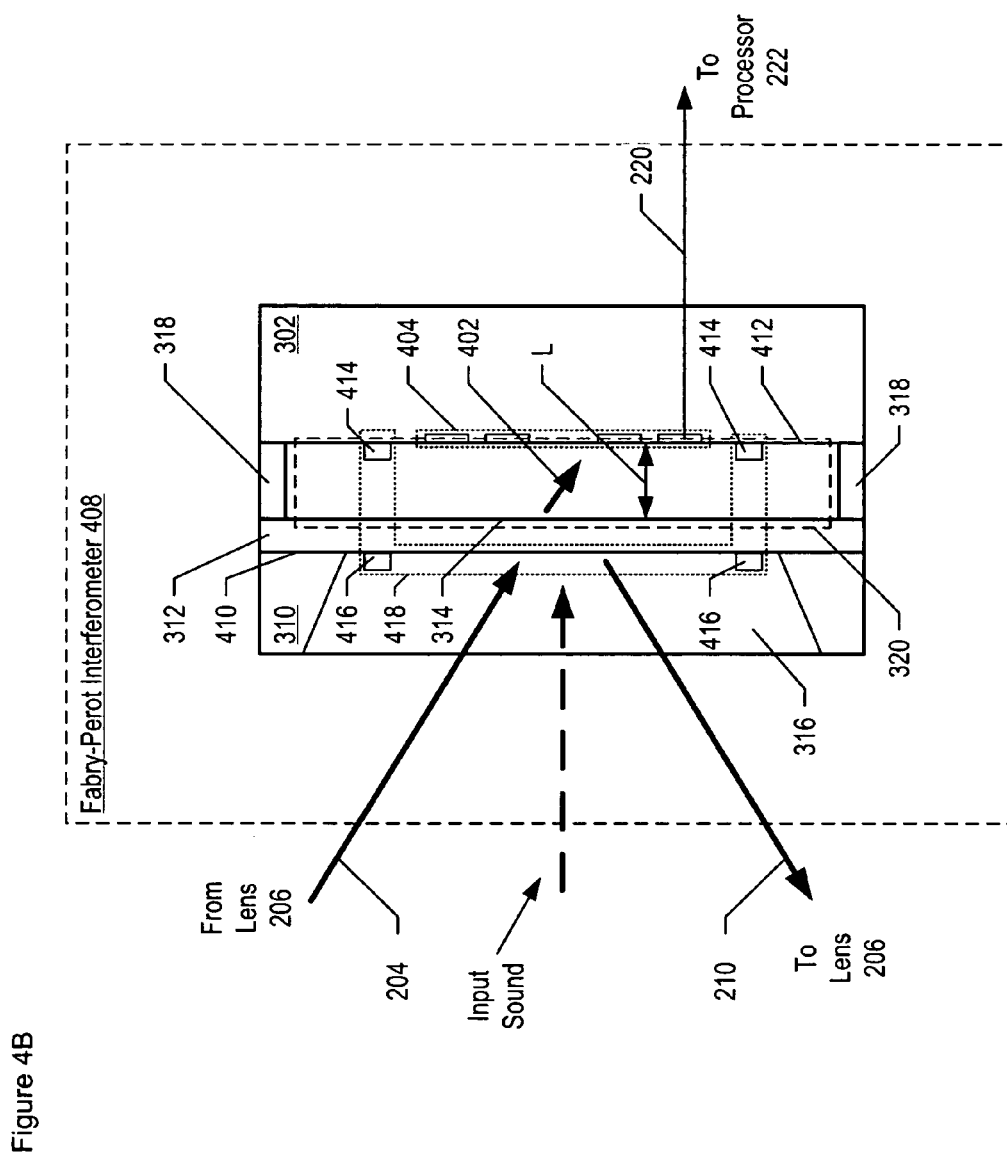
FIG. 4B depicts a cross-sectional view of the salient components of a Fabry-Perot interferometer according to an alternative embodiment of the present invention.

FIG. 4B depicts a cross-sectional view of the salient components of a Fabry-Perot interferometer according to an alternative embodiment of the present invention. Fabry-Perot interferometer 408 comprises substrate 302, substrate 310, layer 312, spacers 318, detector 404, and actuator 418. Fabry-Perot interferometer 408 receives optical beam 204 from lens 206 and splits the optical energy of optical beam 204 into reflected beam 210 and transmitted beam 402. Transmitted beam 402 transits only surface 314 of layer 312. The ratio of optical energy in reflected beam 210 and transmitted beam 402 is dependent upon the characteristics of optically-resonant cavity 320, as was discussed above and with reference to FIG. 3. Optically-resonant cavity 320 is formed by surface 314 of layer 312 and surface 412 of substrate 302, which are separated by cavity length L. Although in the alternative embodiment shown in FIG. 4B substrate 302 does not comprise an access hole, it will be clear to those skilled in the art, after reading this specification, how to make and use embodiments of the present invention wherein substrate 302 comprises an access hole, or embodiments wherein a portion of substrate 302 is removed. In some of these embodiments, a portion of substrate 302 is removed, thereby forming form substrate 302 a suspended membrane that comprises surface 412.

As depicted in FIG. 4B, detector 404 is formed in the body of substrate 302. Surface 412, therefore, is a planar surface and provides one surface of optically-resonant cavity 320, in similar fashion to surface 306 described above and with respect to FIG. 3. In some embodiments, substrate 302 comprises a semiconductor layer in which detector 404 is formed.

Actuator 418 is an electrostatic actuator comprising electrodes 414 and electrodes 416. Electrodes 414 are disposed on surface 412. Electrodes 416 are disposed on surface 410 of layer 312. When a voltage potential is applied between electrodes 416 and 414, an electrostatic force is developed that causes layer 312 to move toward substrate 302. As a result, cavity length L decreases and the reflectivity of Fabry-Perot interferometer 408 changes. In some embodiments, actuator 418 is used to control initial cavity length (i.e., the cavity length in the absence of an environmental stimulus). In some embodiments, actuator 418 is used to control initial cavity length to provide tolerance for:
  i. fabrication variations; or
  ii. mechanical drift; or
  iii. optical misalignment of elements of displacement sensor 102; or
  iv. any combination of i, ii, and iii.

In some embodiments of the present invention, electrodes 416 are disposed on surface 314 of layer 312. In some embodiments of the present invention, electrodes 416 are formed within layer 312. In some embodiments of the present invention, electrodes 414 are formed within substrate 302. It will be clear to those skilled in the art, after reading this specification, how to make and use electrodes 414 and 416. Although actuator 418 is an electrostatic actuator, it will be clear to those skilled in the art, after reading this specification, how to make and use embodiments of the present invention wherein actuator 418 comprises actuators that are not exclusively electrostatic. Suitable actuators include, without limitation, electromagnetic, pneumatic, magnetic, and thermal actuators.

Figure 4C:
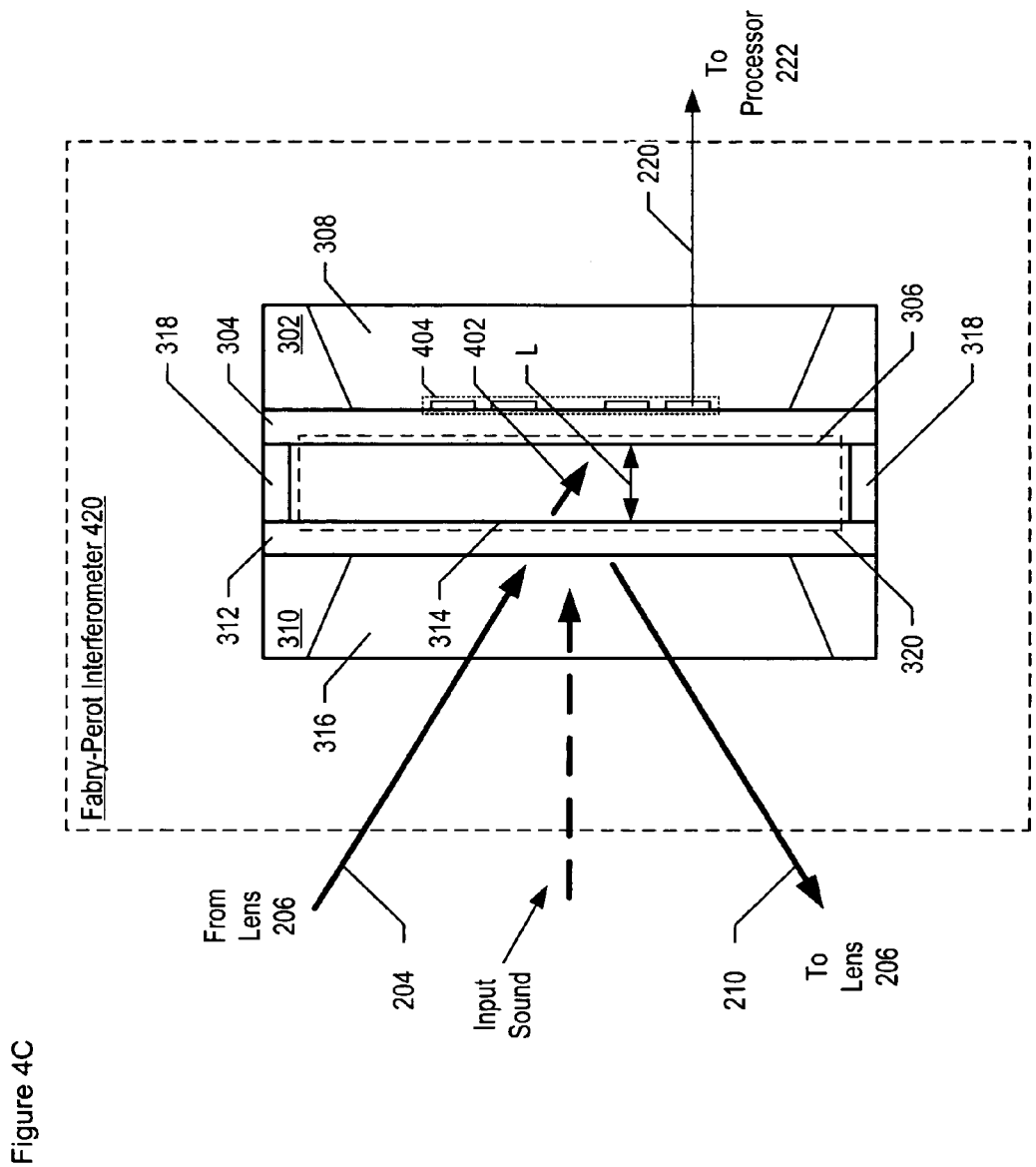
FIG. 4C depicts a cross-sectional view of the salient components of a Fabry-Perot interferometer according to an alternative embodiment of the. present invention.

FIG. 4C depicts a cross-sectional view of the salient components of a Fabry-Perot interferometer according to an alternative embodiment of the present invention. Fabry-Perot interferometer 420 comprises substrate 302, layer 304, substrate 310, layer 312, spacers 318, and detector 404. Fabry-Perot interferometer 208 receives optical beam 204 from lens 206 and splits the optical energy of optical beam 204 into reflected beam 210 and transmitted beam 402. Transmitted beam 402 transits both surfaces 306 and 314 of optically-resonant cavity 320. The ratio of optical energy in reflected beam 210 and transmitted beam 402 is dependent upon the characteristics of optically-resonant cavity 320, as was discussed above and with reference to FIG. 3. Optically-resonant cavity 320 is formed by surface 306 of layer 304 and surface 314 of layer 312, which are separated by cavity length L.

Detector 404 is formed in the body of substrate 302, outside of optically-resonant cavity 320. In some embodiments, detector 404 is formed on the surface of substrate 302 and layer 304 is formed over detector 404. In some embodiments of the present invention, the thickness of layer 304 is an order of $n*\lambda/2$, where $\lambda$ is the wavelength (within layer 304) of light provided by source 202 and n is an integer. In some embodiments of the present invention, layer 304 comprises a multi-layer coating for providing high-reflectivity.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. An apparatus comprising:
   a source for providing optical energy;
   a Fabry-Perot interferometer for receiving said optical energy and distributing said optical energy into reflected optical energy and transmitted optical energy, wherein at least one surface of said Fabry-Perot interferometer comprises a surface of a movable membrane;
   a first detector for detecting at least a portion of said reflected optical energy; and
   a second detector for detecting at least a portion of said transmitted optical energy.

2. The apparatus of claim 1 wherein the cavity length of said Fabry-Perot interferometer varies in response to a pressure differential.

3. The apparatus of claim 1 wherein said movable membrane moves in response to a pressure differential.

4. The apparatus of claim 1 wherein said source comprises a laser.

5. The apparatus of claim 1 wherein said source comprises a light-emitting diode.

6. The apparatus of claim 1 wherein the cavity length of said Fabry-Perot interferometer varies in response to an acceleration of said Fabry-Perot interferometer.

7. The apparatus of claim 1 wherein said movable membrane moves in response to an acceleration of said Fabry-Perot interferometer.

8. An apparatus comprising:
a first surface;
a second surface, wherein said second surface and said first surface are substantially parallel and form an optically-resonant cavity having a cavity length, and wherein said cavity length varies in response to an environmental stimulus;
a first detector for generating a first electrical signal based on energy reflected by at least one of said first surface and said second surface;
a second detector for generating a second electrical signal based on energy that transits at least one of said first surface and said second surface; and
a processor for processing said first electrical signal and said second electrical signal.

9. The apparatus of claim 8 further comprising a source for emitting said energy.

10. The apparatus of claim 9 wherein said source comprises a laser.

11. The apparatus of claim 9 wherein said source comprises a light-emitting diode.

12. The apparatus of claim 8 wherein said environmental stimulus is a pressure differential.

13. The apparatus of claim 8 wherein said environmental stimulus is acoustic energy.

14. The apparatus of claim 8 further comprising an acoustic transducer, wherein said processor generates a third electrical signal based on said first electrical signal and said second electrical signal, and wherein said acoustic transducer generates acoustic energy based on said third electrical signal.

15. The apparatus of claim 8 further comprising an actuator for altering said cavity length.

16. The apparatus of claim 8 wherein said environmental stimulus is an acceleration of at least one of said first surface and said second surface.

17. A method comprising:
generating a first electrical signal, wherein said first electrical signal is based on a reflected signal from a Fabry-Perot interferometer having a variable cavity length, and wherein said reflected signal is based on said cavity length of said Fabry-Perot interferometer;
generating a second electrical signal, wherein said second electrical signal is based on a transmitted signal that transits at least one surface that composes said Fabry-Perot interferometer, wherein said second electrical signal is based on the cavity length of said Fabry-Perot interferometer;
computing a third electrical signal, wherein said third electrical signal is based on said first electrical signal and said second electrical signal.

18. The method of claim 17 wherein said third signal is based on a common-mode characteristic of said first electrical signal and said second electrical signal.

19. The method of claim 17 wherein said second beam transits both surfaces that form the optically-resonant cavity of said Fabry-Perot interferometer.

20. The method of claim 17 wherein said Fabry-Perot interferometer comprises a movable surface, and wherein said third signal is based on the motion of said movable surface.

21. The method of claim 17 wherein the computation of said third signal is based on a summation of said first signal and said second signal.

22. The method of claim 17 wherein the computation of said third signal is based on a difference of said first signal and said second signal.

* * * * *